(12) United States Patent
Hemmingsen et al.

(10) Patent No.: US 6,602,161 B2
(45) Date of Patent: Aug. 5, 2003

(54) ARRANGEMENT FOR OPERATING THE CLUTCH IN THE POWER TRAIN OF A MOTOR VEHICLE

(75) Inventors: Fred Roar Hemmingsen, Kongsberg (NO); Karl Frode Ring, Asker (NO); Ole Jonny Waerp, Kongsberg (NO); Torgeir Sundet, Kongsberg (NO); Morten Berger Gunnerud, Lurdalen (NO)

(73) Assignee: LuK Lamellen und Kupplungsbau Beteiligungs KG, Buhl/Baden (DE)

( * ) Notice: Subject to any disclaimer, the term of this patent is extended or adjusted under 35 U.S.C. 154(b) by 0 days.

(21) Appl. No.: 09/953,231

(22) Filed: Sep. 14, 2001

(65) Prior Publication Data

US 2002/0086769 A1 Jul. 4, 2002

Related U.S. Application Data

(63) Continuation of application No. PCT/DE00/00800, filed on Mar. 13, 2000.

(30) Foreign Application Priority Data

Mar. 15, 1999 (DE) .......................... 199 11 332

(51) Int. Cl.⁷ .................. B60K 41/02; B60K 41/24; B60K 41/28
(52) U.S. Cl. .................. 477/79; 192/3.55; 192/3.57; 477/80; 477/180; 701/67
(58) Field of Search .................. 477/79, 80, 176, 477/180; 192/3.55, 3.62, 3.57; 701/67

(56) References Cited

U.S. PATENT DOCUMENTS

| | | | | |
|---|---|---|---|---|
| 4,576,062 A | * | 3/1986 | Reppert et al. ............. 192/222 |
| 4,825,993 A | * | 5/1989 | Kurihara et al. ............. 477/79 |
| 5,002,170 A | * | 3/1991 | Parsons et al. ............. 477/174 |
| 5,176,234 A | | 1/1993 | Reik et al. ..................... 192/52 |
| 5,337,868 A | | 8/1994 | Liu et al. ....................... 477/74 |
| 5,450,934 A | | 9/1995 | Maucher .................. 192/70.25 |
| 5,626,534 A | * | 5/1997 | Ashley et al. ................. 477/79 |
| 5,819,585 A | * | 10/1998 | Darnell ......................... 477/79 |
| 5,928,110 A | * | 7/1999 | Vornehm et al. ............. 477/114 |
| 5,993,350 A | * | 11/1999 | Lawrie et al. ............. 180/65.2 |
| 6,358,186 B1 | * | 3/2002 | Kosik et al. ................. 477/176 |

FOREIGN PATENT DOCUMENTS

| | | |
|---|---|---|
| DE | 43 26 862 A 1 | 3/1994 |
| EP | 0038 113 A2 | 10/1981 |
| EP | 0038 113 B1 | 7/1986 |
| EP | 0 601 728 A1 | 6/1994 |
| EP | 0696 341 | 2/1996 |
| EP | 0 735 957 B1 | 9/1998 |
| WO | WO 95/22013 | 8/1995 |
| WO | WO 97/03497 | 1/1997 |

\* cited by examiner

Primary Examiner—Sherry Estremsky
Assistant Examiner—Tisha D. Lewis
(74) Attorney, Agent, or Firm—Darby & Darby

(57) ABSTRACT

The power train of a motor vehicle employs an electronic control unit which selects the extent of engagement of the friction clutch between the engine and the transmission by way of an electronic or fluid-operated actuator. The throttle valve for the engine is adjustable by the control unit and/or by the accelerator pedal to ensure predictable starting of the motor vehicle from standstill on a road surface having a pronounced slope and/or when the motor vehicle carries a heavy load.

21 Claims, 3 Drawing Sheets

ARRANGEMENT FOR OPERATING THE CLUTCH IN THE POWER TRAIN OF A MOTOR VEHICLE

This is a continuation of international application Serial No. PCT/DE00/00800, filed Mar. 13, 2000, the entire disclosure of which is hereby incorporated by reference.

CROSS-REFERENCE TO RELATED CASES

This application claims the priority of the commonly owned German patent application Serial No. 199 11 332.7 filed Mar. 15, 1999 and of the International patent application Serial No. PCT/DE00/00800 filed Mar. 13, 2000. The disclosures of the above-referenced priority applications, as well as that of each U.S. and foreign patent and patent application identified in the specification of the present application, is incorporated herein by reference.

BACKGROUND OF THE INVENTION

The present invention relates to improvements in power trains for motor vehicles. More particularly, the invention relates to improvements in means for automatically controlling or regulating the operation of a component (such as the friction clutch) which, when engaged, is arranged to transmit torque between the rotary output element of a prime mover (such as the camshaft or the crankshaft of an internal combustion engine) and the rotary input element (such as the input shaft of a change-speed transmission, especially a transmission having a plurality of fixed ratios or gears including at least one reverse gear, a neutral gear and several forward gears). A ratio selector member, such as a lever, can be manipulated by the operator of the motor vehicle to select the necessary gear of the transmission. Such power trains are normally further equipped with accelerator pedals which are adjustable to regulate the RPM of the prime mover. The controls for the friction clutch are designed to automatically engage and disengage the clutch, i.e., to disengage the clutch prior to shifting of the transmission into a different gear and to automatically engage the clutch when the shifting into a selected gear is completed.

More specifically, the invention relates to power trains of the type wherein the clutch is operated automatically during the initial stage of operation of the power train, namely while the motor vehicle is being started from zero speed.

European patent No. 0038113 discloses a power train with a clutch control system which is designed to generate an RPM reference signal during starting of the motor vehicle and wherein the engine speed (i.e., the RPM of the rotary output element of the engine) is controlled by engaging the clutch in such a way that the engine speed follows an RPM reference signal. In accordance with the patented invention, the reference RPM is derived from the angle of the pivotable valving element or flap of the throttle valve which regulates the admission of fuel into the engine. The arrangement is such that, when the engine torque increases (i.e., in response to increased rate of fuel admission to the engine), the reference signal is altered in order to correspond (i.e., to be properly related) to the higher speed of the engine. The extent of engagement of the clutch is proportional to the difference between the engine speed and the reference RPM. The extent of engagement of the clutch increases if the difference between the (higher) engine speed and the (lower) reference RPM increases.

European patent No. 0696341 discloses certain modifications of the power train which is disclosed in the afore-discussed European patent No. 0038113. Such modifications take into consideration an increased idling RPM of the engine and the shifting of the transmission into a starting gear when the engine speed is increased (by opening the throttle valve) prior to shifting of the transmission into such starting gear.

Additional modifications of the power train protected by the European patent No. 0038113 are disclosed in European patent No. 0735957, namely to ensure satisfactory regulation of engagement of the clutch when the motor vehicle is to be started at a low speed of the engine, i.e., when it is necessary to maneuver (operate) the motor vehicle at relatively low speeds of the engine or another suitable prime mover.

The combined teachings of the European patents Nos. 0038113, 0735957 and 0696341 disclose a power train wherein the operation of the clutch is adequately controlled during starting of the motor vehicle if the starting takes place while the throttle valve is open to a relatively small extent (i.e., when the angular position of the flap of the throttle valve is remote from the angular position such flap assumes in the fully open condition of the throttle valve. If the angle of the flap is less than 20% of the angle in the fully open position of the valve, the maximum torque normally develops at engine speeds of less than about 1500 1/min. If the angle is increased above 20% of the maximum angle, e.g., to between 60% and 90%, the engine speed rapidly increases to provide a maximum torque. In presently known power trains, such mode of operation permits for a rapid engagement of the clutch which, however, invariably or frequently entails a choking of the engine. Moreover, even though (under normal circumstances) certain presently known power trains permit for a starting of the motor vehicle from a standstill in a slightly open position of the throttle valve, it is necessary to open the throttle valve to a much greater extent if the vehicle is to be set in motion along a steep road surface and/or while the vehicle carries a substantial load.

International application Serial No. PCT/GB97/03497 (published Jul. 2, 1998) under No. WO 98/28162) discloses a method of determining, during a clutch reengagement stage, the so-called kiss point of the clutch. The latter includes a driven plate which transmits torque from the engine to the wheels by way of a multiple-ratio transmission when the clutch is engaged. The clutch actuating mechanism is controlled by an electronic control unit. The method includes the steps of checking whether or not the throttle valve is closed and the vehicle is in an engine overrun condition, partially reengaging the clutch up to a point where the clutch increases the engine speed to a substantially constant level below the speed of the drive plate, monitoring the position of the clutch actuating mechanism when the clutch is partly engaged, computing on the basis of such condition measurements and the known engagement/torque characteristics of the clutch at the current kiss-point position and completing the engagement of the clutch. The inventors named in the aforementioned U.S. patent state that the object of their invention is to calibrate the clutch and more specifically, to determine "the so-called 'Kiss-point' of a clutch when the clutch just begins to make frictional contact during its engagement". The inventors further state that an object of their invention is to provide a method of determining the kiss-point of a clutch which can be regularly implemented during use of the associated vehicle with the minimal effect on the operation of the vehicle so that the determination is not perceived by the operator or passengers.

Commonly owned U.S. Pat. No. 5,176,234 (granted Jan. 5, 1992 to Reik et al. for "METHOD OF REGULATING THE OPERATION OF AUTOMATIC CLUTCHES") discloses a method of regulating the operation of an automatic friction clutch, which is installed between a prime mover and a transmission in a power train of a motor vehicle, during at least one of various stages of operation including starting, driving, accelerating, braking, driving in reverse and parking of the vehicle and shifting of transmission into different gears as well as during transitions between such stages. The patented method comprises the steps of monitoring—at least for the purpose of starting the vehicle—at least one selected predetermined parameter including measuring the torque in the power train and/or the angular positions of clutch parts while the condition of the clutch is being changed from clutch-open, with the vehicle at a standstill and with the transmission in a gear other than neutral, at a predetermined speed toward clutch-closed to an extent such that the clutch transmits a torque less than that which is required to set the vehicle in motion, determining the clutch-open condition when the transmitted torque and/or the angular positions of clutch parts reach a predetermined value, memorizing such value, thereupon changing the condition of the clutch toward clutch-open, fully opening the clutch in dependency on starting of the engine, thereupon closing the clutch at least until determination of regulation starting point, memorizing the corresponding condition of the clutch, and thereupon reopening the clutch until the clutch reaches a state of readiness.

European patent No. 0 601 728 A1 to Slicker et al. discloses a friction clutch which couples the engine and the gear transmission of a vehicle and is controlled by a microprocessor based circuit using logic which defines operating modes according to engine and clutch conditions. During the time of clutch closure, when the vehicle is starting from rest in a startup or launch mode, the throttle or other engine control signal is restrained from quickly responding to the accelerator pedal. This avoids engine overspeeding which results in generating high torque before sufficient clutch capacity has been achieved. The control signal is developed as a function of the pedal position under control of throttle logic which, in turn, is dependent upon clutch operating modes defined by the clutch logic. The clutch operating modes are four modes for automatic clutch operation comprising touch point approach mode which prohibits a throttle signal during initial clutch movement, creep mode or startup mode after touch point occurs, and lockup mode for completing clutch closing when low clutch slip is attained. A non-automatic mode is entered before the accelerator pedal is depressed or when engine stall conditions are detected.

OBJECTS OF THE INVENTION

An object of the present invention is to provide a power train which is superior to presently known power trains under several circumstances such as setting the motor vehicle in motion on a steeply inclined road surface and/or while the vehicle carries a substantial load.

Another object of the invention is to provide a novel and improved control unit or system for the friction clutch which is engageable to transmit torque between a prime mover and a transmission in the power train of a motor vehicle.

A further object of the invention is to provide a novel and improved engine-clutch-transmission combination for use in the power train of a motor vehicle.

An additional object of the instant invention is to provide a motor vehicle which embodies the above outlined power train.

Still another object of the present invention is to provide a power train which exhibits the above outlined features and characteristics and can utilize an automatic clutch actuating device in conjunction with a partially or fully engaged change-speed transmission.

A further object of the invention is to provide an electronic clutch actuating or clutch control unit which employs an electric motor, a pneumatic device or a hydraulic device which serves to select the extent of engagement of the friction clutch in the power train of a motor vehicle.

An additional object of the invention is to provide a novel and improved method of operating the friction clutch between the engine and the transmission in the power train of a motor vehicle, especially preparatory to and during the initial stage or stages of setting a motor vehicle in motion, for example, while the motor vehicle is supported by a steeply inclined surface and/or when the motor vehicle carries a large load.

SUMMARY OF THE INVENTION

One feature of the present invention resides in the provision of a power train for use in a motor vehicle. The improved power train comprises a variable-speed prime mover (such as an internal combustion engine) arranged to furnish a plurality of different torques including a maximum torque and having an output element (such as a camshaft or a crankshaft) arranged to rotate at a plurality of different speeds, means for varying the speed of the prime mover including an energy supplying device (such as a throttle valve) which is adjustable between a plurality of positions including a threshold position, a transmission which is selectively shiftable into a neutral gear and a plurality of additional gears (such as at least one reverse gear and one, two, three or more forward gears), means (such as a ratio selecting lever) for shifting the transmission into different gears, a torque transmitting friction clutch which is engageable and disengageable to respectively transmit and interrupt the transmission of torque between the output element of the prime mover and a rotary input element (e.g., a shaft) of the transmission, and control means for the clutch. The control means includes means for disengaging the clutch prior to shifting of the transmission from neutral gear into one of the additional gears preparatory to setting of the vehicle in motion in response to shifting of the transmission into the one additional gear, to subsequent adjustment of the energy supplying device beyond the threshold position and subsequent to partial engagement of the clutch to a condition in which the clutch transmits torque without play in the power train. The control means is arranged to effect a greater engagement of the clutch beyond the partial engagement in response to the establishment of a predetermined difference between an actual speed of the output element of the prime mover and a reference speed; such greater engagement of the clutch results in the transmission of a torque corresponding to that when the speed of the prime mover at least approximates the reference speed regardless of the adjustment of the energy supplying device at the time when the motor vehicle is being set in motion.

The means for adjusting the throttle valve can include an accelerator pedal or the like.

The friction clutch can be of the type wherein at least one pressure plate is driven by the output element of the prime mover and which further includes an output member (such as a clutch disc provided with customary friction linings) which is connected with the input element of the transmission. The establishment of the aforementioned partial engagement of the clutch can include a movement of the at least one pressure plate into frictional engagement with the output member of the clutch, and the control means is or can be further arranged to engage the at least one pressure plate with the driven member of the clutch and to thus establish the aforementioned condition of the clutch when the energy supplying device is adjusted to assume the threshold position. Furthermore, the control means is or can be arranged to engage the clutch with a slip between the at least one plate and the output member of the clutch to an extent such that the torque being then transmitted by the clutch is less than but approximates (such as closely approximates) the maximum torque adapted to be furnished by the prime mover. The reference speed of the output element of the prime mover is or can be a function of the extent of adjustment of the energy supplying device and is selected to ensure that the extent of engagement of the clutch at least approximates the extent which is necessary to ensure that the torque being transmitted by the clutch at least approximates the torque being transmitted by the output element of the prime mover. The reference speed can be derived by subtracting a function depending upon the position of the energy supplying device from an initial speed of the prime mover. For example, the reference speed can be derived from an initial prime mover speed by subtracting from the initial prime mover speed a constant and a first function dependent upon the position of the energy supplying device and by adding—at positions of the energy supplying device beyond a threshold position—a second function dependent upon the position of the energy supplying device. The reference speed is or can be maintained at a maximum value at least in one position of the energy supplying device beyond a second threshold position. The just mentioned maximum value of the reference speed can be at most 1000 RPM (often at most 500 RPM) above an idling speed of the prime mover.

In accordance with one presently preferred embodiment of the invention, the reference speed is a function of the position of the energy supplying device, of the selected gear of the transmission and the speed of the motor vehicle, and such reference speed can be derived or ascertained by resorting to the equation $$R_{REF}=f(\alpha, \text{gear, vehicle speed})$$

wherein $R_{REF}$ is the reference speed, $\alpha$ is the angular position of the flap or another suitable pivotable member of the throttle valve or another suitable energy supplying device expressed as a percentage of full travel of the pivotable member, "gear" is the gear selected by the shifting means, and "vehicle speed" is self-explanatory.

The reference speed can be further derived in dependency upon buffer means. The rate of change of the reference speed with changes of angular position of the pivotable member can be matched with changes of speed of the prime mover in response to changes of position of the pivotable member. Such power train can further comprise a low pass filter for the reference speed to establish a dynamic correspondence between the reference speed and the speed of the prime mover. The characteristics of the low pass filter can vary with shifting of the transmission into selected gears and as a function of variations of at least one of (a) the speed of the prime mover, (b) the speed of the input element of the transmission, and (c) the speed of the motor vehicle. The initial value of the output of the low pass filter can at least substantially match the speed of the prime mover. Furthermore, the output of the low pass filter can converge upon the value of the reference speed as determined by the position of the energy supplying device.

In deriving the reference speed from an initial speed of the prime mover, the initial speed is or can be reduced exponentially toward an idling speed of the prime mover.

In accordance with a further modification, the reference speed can be arrived at in accordance with the equation $$R_{REF}=R_{INT}-K-K_1+K_2(\alpha-\alpha_T)^2$$

wherein $R_{INT}$ is an initial speed of the prime mover, K is a first constant, $K_1$ is a second constant, $K_2$ is a third constant, $\alpha$ is the angular position of a pivotable member of the energy supplying device expressed as a percentage of full travel of the pivotable member, $\alpha_T$ is a threshold angle of the pivotable member expressed as a percentage of full travel of the pivotable member, and $K_2(\alpha-\alpha_T)^2$ is applicable only when $\alpha>\alpha_T$.

The value of $\alpha_T$ is or can be between 40% and 60% of full travel of the pivotable member of the energy supplying device, and the values of the aforementioned constants K, $K_1$ and $K_2$ are or can be dependent upon the selection of the gear of the transmission.

Another feature of the present invention resides in the provision of a clutch control system for the automatic control of an engageable and disengageable clutch in a motor vehicle wherein the clutch connects an engine with a gearbox and the gearbox has a plurality of fixed ratios and a neutral ratio as well as selector means by which the neutral ratio and any one of the fixed ratios can be selected. The motor vehicle is provided with a throttle and with a throttle control for controlling the speed of the aforesaid engine. The clutch control system automatically controls the engagement and disengagement of the clutch to permit changes of the gear ratio and the clutch control system is arranged to permit take-up from disengagement of the clutch to be initiated upon selection of the takeup gear. Subsequent opening of the throttle control beyond a threshold value causes the clutch to be engaged to a point at which any lost motion in a power train between the engine and the gearbox is subsequently taken up. Further engagement of the clutch depends upon the difference between the actual speed and a reference speed of the engine, and the reference speed can be derived in such a way that the difference between the actual speed and the reference speed establishes an extent of clutch engagement which permits for the transmission of torque that is substantially equal to torque being furnished by the engine at the actual engine speed over the full range of throttle openings encountered during takeup from rest position.

A further feature of the invention resides in the provision of methods of operating the clutch in the power train of a motor vehicle in a manner as pointed out herein-before, as pointed out in the following detailed description of the drawings and as pointed out in the appended claims.

The novel features which are considered as characteristic of the invention are set forth in particular in the appended claims. The improved power train itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
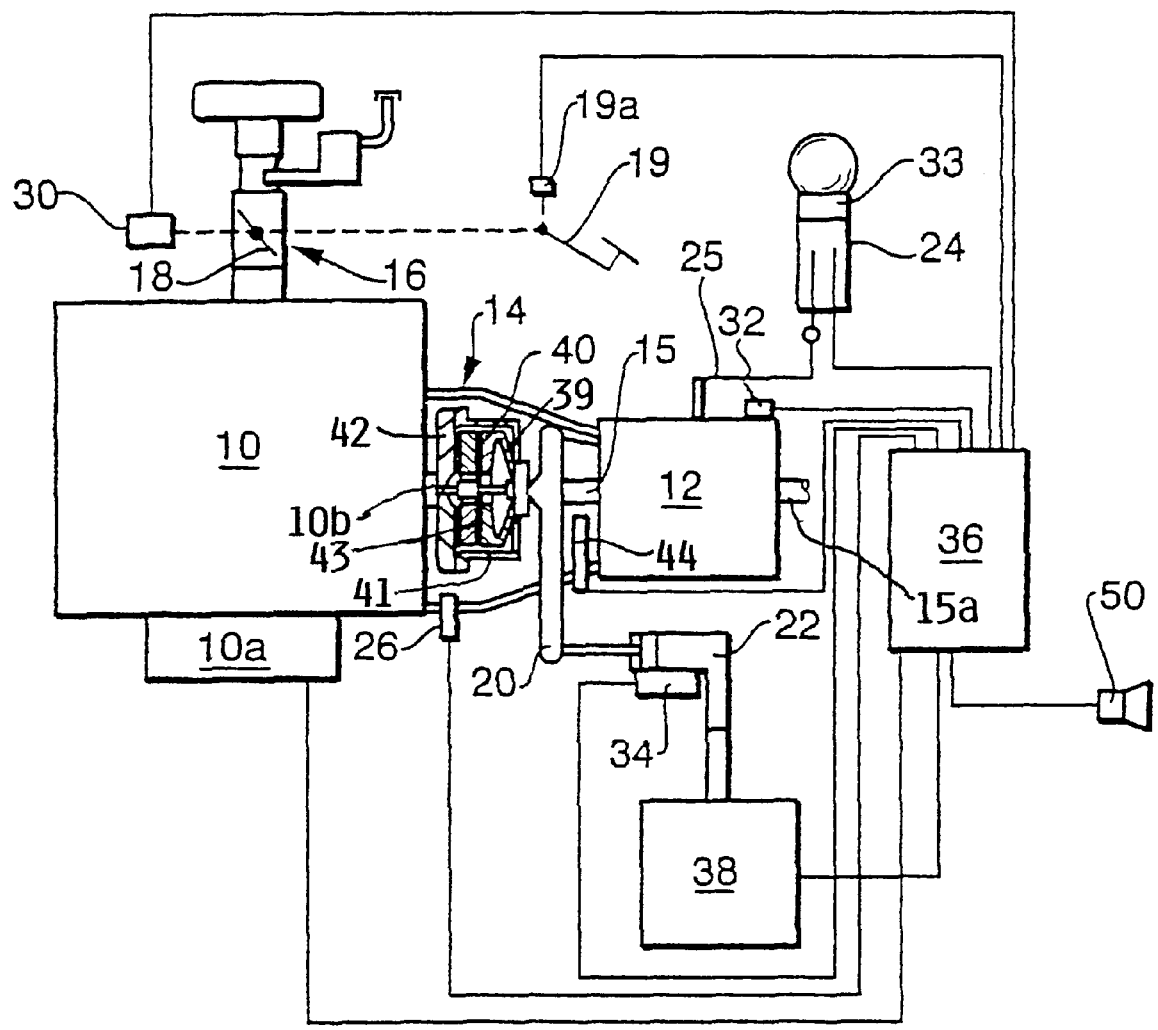
FIG. 1 is a schematic plan view of a power train which embodies one form of the present invention.

FIG. 1 shows a power train which is installed in a motor vehicle and includes a prime mover 10 which can constitute an internal combustion engine and serves to generate and transmit torque to the rotary input element 15 (such as a shaft) of a variable-speed transmission 12 by way of an engageable/disengageable friction clutch 14. The character 10a denotes the starter and the appurtenant starter circuit for the prime mover (hereinafter referred to as engine) 10. The means for supplying energy (fuel) to the said engine 10 includes an adjustable throttle valve 18 installed in a housing 16 and being actuatable by a gas pedal (accelerator pedal) 19. The engine 10 can constitute an otto engine with a mechanically (gas pedal) operated fuel supplying means. However, it is to be understood that this simple Otto engine can be replaced by a prime mover associated with a mechanically or electronically operated fuel injection system, with a diesel engine or with any other suitable (e.g., hybrid) prime mover.

The control means for actuating the friction clutch 14 includes a hydraulically operated slave cylinder 22 which can change the position of the clutch spring 39 (such as a diaphragm spring) in the housing or cover 41 of the clutch by way of of a clutch disengaging or clutch release fork 20. The illustrated clutch 14 further comprises a pressure plate 40, a counterpressure plate 42 and a clutch disc 43 disposed between the two plates and arranged to transmit torque to the input shaft 15 of the transmission 12. The counterpressure plate 42 is driven by the rotary output element 10b of the engine 10 and transmits torque to the housing 41 and pressure plate 40 of the clutch 14 as well as to the clutch disc 43 when the clutch 14 is at least partly engaged. Reference may be had, for example, to commonly owned U.S. Pat. No. 5,450,934 which was granted to Mr. Paul Maucher on Sep. 19, 1995 and is titled "FRICTION CLUTCH", as well as to numerous other U.S. patents owned by the assignee of the present application and dealing with friction clutches for use in the power trains of motor vehicles.

The transmission 12 is a multi-ratio transmission having, for example, a neutral ratio or gear, at least one reverse ratio or gear, and two or more forward ratios or gears. The means for selecting a given transmission ratio includes a selector member (e.g., a lever) 24 which can shift the transmission 12 by way of a suitable linkage 25. A load-sensing switch 33 (also called load monitoring shifter) is provided to monitor the parameters of the force being applied by the operator of the motor vehicle. The signal or signals being generated by the switch 33 are indicative of the operator's intent, e.g., of the intent to shift the transmission 12 into neutral, forward or reverse gear. Such signals are transmitted at least to an electronic control unit or circuit 36 which controls the operation of the slave cylinder 22 (i.e., the condition of the clutch 14) by way of a hydraulic actuator or control device 38.

The control unit 36 receives signals from the aforementioned switch 33 (i.e., signals denoting the operator's intent regarding the shifting of the transmission 12 into a particular gear), from an engine speed (RPM) sensor 26, from a sensor 30 which monitors the position or condition of the mobile element of the throttle valve 18 (i.e., of the rate of admission of fuel to the engine 10), from a sensor 19a which monitors the positions of the accelerator pedal 19, from a sensor 32 which monitors the condition of the transmission 12 and transmits signals denoting the momentary ratio or gear, from a sensor 34 which monitors the condition of the slave cylinder 22, and from a sensor 44 which monitors the speed (RPM) of the pressure plate 40 (i.e., of the input shaft 15 in the engaged condition of the clutch 14).

Since the speed of the motor vehicle embodying the power train of FIG. 1 is dependent upon the speed (RPM) of the pressure plate 40 of the clutch 14 and the momentary ratio of the transmission 12, the sensor 44 performs the additional function of generating signals which are indicative of the speed of the motor vehicle (or vice versa). The sensor 44 is optional; for example, this sensor can be omitted or disconnected or deactivated if the control unit 36 embodies means for calculating the RPM of the pressure plate 40 on the basis of the selected transmission ratio (sensor 32) and on the basis of the speed of the motor vehicle (such speed is monitored by a suitable speedometer, not shown).

The control unit 36 has an output which is connected to an alarm 50 (e.g., a buzzer or another generator of audible signals). The alarm 50 is actuated under certain circumstances which warrant the generation of signals and/or to otherwise warn the operator of the motor vehicle that certain circumstances are about to develop. The illustrated audible signal generator 50 can be replaced by or utilized jointly with one or more generators of visible signals (e.g., with a blinker) or any other readily detectable signals.

The multi-ratio transmission 12 is mechanically connected with the ratio selecting lever 24 by the linkage 25, i.e., the various gear ratios can be selected by hand. However, it is equally within the purview of the present invention to employ a semiautomatic transmission wherein the mechanical linkage 25 is replaced with an electronic ratio selecting system, or a fully automatic transmission wherein the lever 24 or an equivalent thereof directly shifts into neutral, reverse or a forward gear.

The novel features of the improved power train involve primarily the regulation during starting of the motor vehicle, i.e., while the vehicle is being set in motion toward reaching of a given speed starting with zero speed. Some of the prerequisites which must be satisfied by the power train under the just outlined circumstances are as follows:

1. If the motor vehicle is to be set in motion along a very steep road surface, it is necessary to ensure that the output element 15a of the transmission 15 transmits a maximum percentage of torque which the engine 10 can furnish. Therefore, the regulation of starting of the motor vehicle should be limited to regulation of the engine RPM within that range when the engine can furnish a maximum torque and, in addition, one should ensure that the engine RPM should not be too high because this would entail a reduction of torque and an increased slip of the clutch 12 (i.e., excessive slippage of the clutch disc 43 and the (counterpressure and pressure) plates 40, 42 relative to each other.

2. During starting which necessitates only moderate torques, it is advisable to limit the extent of slip between the (pressure and counterpressure) plates 40, 42 on the one hand, and the clutch disc 43 on the other hand; this ensures that the clutch 14 (and especially the clutch disc 43) is not subjected to extensive (such as excessive) frictional stresses, i.e., it is advisable to maintain the slippage at a minimum value.

3. If the power train employs a prime mover 10 (such as a combustion engine) having a moderate output, the curves denoting or representing the torque being supplied by the engine indicate that, if the angle of opening of the throttle valve 18 is less than 20% of the maximum value, the maximum torque is less than 1500 l/min.

Thus, for that stage of the starting operation during which up to 66% of the engine torque is available, the system which controls the starting of the engine should maintain the engine RPM at a relatively low value.

4. Within the range of between 60% and 100% of the maximum torque, the engine RPM should rise rapidly in response to opening of the throttle valve 18 if one is to achieve or arrive at a maximum engine torque.

In accordance with an important feature of the present invention, a starting of the motor vehicle from zero speed is initiated in that one selects a gear ratio other than neutral gear (i.e., the reverse gear or one of reverse gears or the first or second forward gear) while the control unit 36 receives current and the engine 10 is running. The transmission 12 can be shifted into a selected gear by hand in response to actuation of the ratio or gear selector lever 24; this causes the load sensing switch 24 to generate a signal which effects a disengagement of the clutch 14 via control unit 36, control device 38, slave cylinder 22 and clutch release fork 20. Such disengagement of the clutch 14 takes place prior to shifting of the transmission 12 into reverse gear or into a forward gear. If the transmission 12 is replaced with an automatic or with a semiautomatic transmission, the friction clutch 14 can be disengaged automatically and the transmission is thereupon shifted into a forward gear or into a (or the only) reverse gear; this is carried out by shifting the lever 24 from neutral into a forward gear (such as the first or second forward gear) or into a (or the) reverse gear.

At the instant when the transmission 12 is shifted into a forward or reverse gear, the control unit 36 and the hydraulic control device 38 cause the slave cylinder 22 to assume a condition or position beyond which the engagement of the clutch 14 would reach a stage at which counterpressure plate 42 and the pressure plate 40 could cause the clutch disc 43 to transmit torque to the input shaft 15 of the transmission 12.

If the throttle valve 18 is adjusted to a low threshold value (normally about 1% of the maximum-load angle), such position or condition of the throttle valve is detected by the throttle valve position sensor 30 and a signal from this sensor effects a further engagement of the clutch 14 to thus eliminate any play in the power train. At such time, the engine speed sensor 26 detects the RPM (i.e., the RPM=$R_{INT}$ of the output element 10b of the engine), and such information is stored and/or indicated in the prime mover. Under such circumstances, the then established torque does not suffice to overcome the static friction of the vehicle and to thus set the vehicle in motion.

As will be described in greater detail hereinafter, further opening of the throttle valve 18, namely beyond the aforementioned lower threshold value, entails a further engagement of the friction clutch 14 so that the vehicle is set in motion.

When the throttle valve 18 is opened beyond the lower threshold value, any further (more pronounced) engagement of the friction clutch 14 takes place proportionally with the difference between the RPM of the engine 10 and a reference RPM. If the reference RPM (hereinafter also called $R_{REF}$) continues to decrease below the engine RPM, the extent of engagement of the friction clutch 14 increases jointly with the clutch torque and hence with the torque being transmitted by the clutch.

The value of $R_{REF}$ can be calculated by resorting to the following first equation:

$$R_{REF} = f(\alpha, \text{selected transmission ratio, driving speed})$$

wherein $\alpha$ is the angle of the valving element or flap of the throttle valve 18 expressed as the percentage of the maximum throttle valve angle; "ratio" is the selected speed ratio of the transmission 12, and "driving speed" is the speed of the motor vehicle.

The value of $R_{REF}$ can also be be ascertained by resorting to the following second equation:

$$R_{REF} = R_{INT} - K - K_1 \cdot \alpha + K_2 \cdot (\alpha - \alpha_T)^2$$

wherein $R_{INT}$ is the starting RPM of the engine 10, K is a first constant, $K_1$ is a second constant, $K_2$ is a third constant, $\alpha$ is the angle of the flap of the throttle valve 18 expressed as the percentage of the maximum throttle valve flap angle, $\alpha_T$ is a "high" threshold value of the throttle valve flap opening expressed as the percentage of the maximum throttle valve flap opening, and the function $K_2(\alpha - \alpha_T)^2$ is resorted to only when a is greater than $\alpha_T$.

The values of the constants K, $K_1$ and $K_2$ vary in dependency upon specific motor vehicles as a function of the selected transmission gear ratio. Typical values of these constants for starting in the first forward gear are as follows:

K=100 l/min, $K_1$=60 l/min per %, and $K_2$=375 l/min per %².

If the opening angle of the throttle valve flap exceeds the threshold value, the reference RPM, namely the $R_{REF}$, is limited to a maximum value which, as a rule or typically, is above the idling RPM of the engine by up to 500 l/min.

In many instances, the high threshold value of the opening defined by the flap of the throttle valve 18 is between about 40% and about 60% of the largest throttle valve opening.

Figure 2:
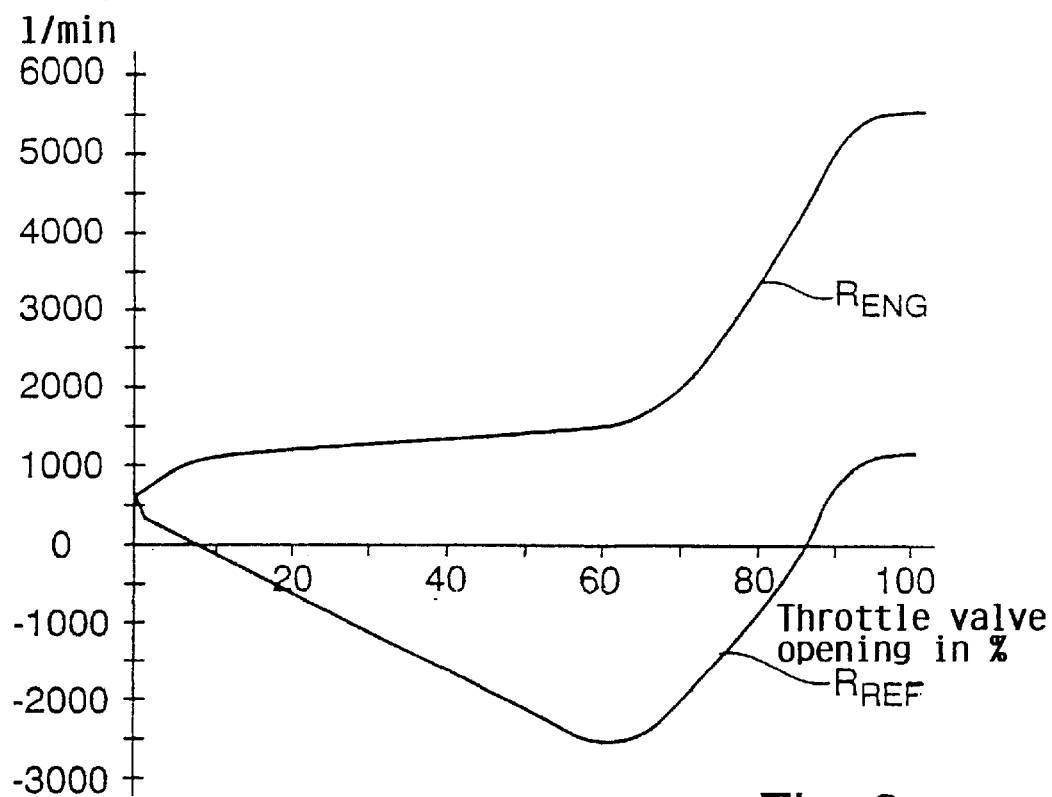
FIG. 2 shows a coordinate system wherein the curves denote changes of the engine speed and the reference speed in different angular positions of the pivotable member of an energy supplying device in the form of an adjustable throttle valve for the engine.
Figure 3:
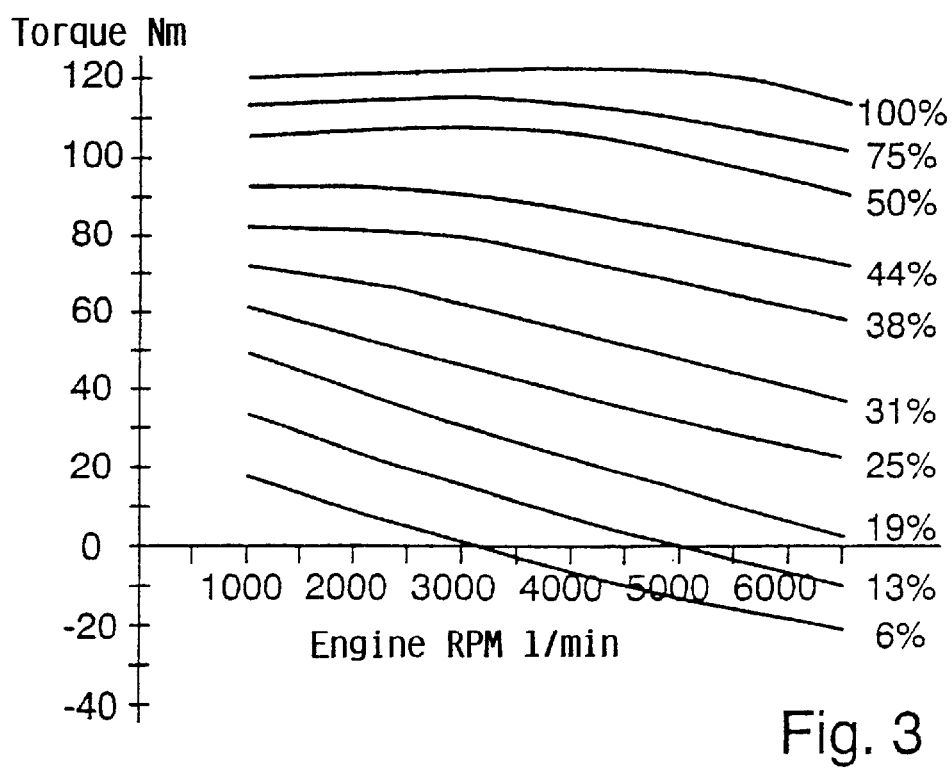
FIG. 3 shows a coordinate system wherein the curves denote variations of torque as a function of changes of the RPM of the rotary output element of the engine.

A typical relationship between the reference rotational speed $R_{REF}$ and the opening defined by the flap of the throttle valve 18 is represented by the curves $R_{ENG}$ (the RPM of the output element 10b of the engine 10) and $R_{REF}$ (the reference RPM of the engine) in the coordinate system of FIG. 2. The value of $R_{REF}$ decreases linearly all the way to the high value of the throttle valve opening (such high value is presumed to be about 50%) and thereupon increases while the value of $R_{ENG}$ increases from about 500 to between about 1100 and 1300 l/min at the throttle valve of about 90%. If such representation is compared with typical engine torque curves (see FIG. 3), the linearly decreasing first section of the curve $R_{ref}$ corresponds to those open positions of the flap of the throttle valve 18 at which the maximum torque is generated at an engine RPM of below 2000 per minute. The rising portion of the curve $R_{REF}$ corresponds to those positions of the flap of the throttle valve at which the engine RPM rapidly increases to a value corresponding to the maximum transmitted torque. Thus, the difference or distance between the engine RPM curve $R_{ENG}$ in FIG. 2 and reference RPM curve $R_{REF}$, which develops when the extent of opening of the throttle valve 18 increases is determined by regulation to thus avoid rapid engagement of the friction clutch 14 at such further increased opening of the throttle valve 18.

In order to ensure that the dynamic responsiveness to a change of the reference rotational speed $R_{REF}$ corresponds to changes of the engine RPM in response to further opening of the throttle valve 18, and in order to avoid abrupt changes in the engaged condition of the clutch 14, the derived reference rotational speed $R_{REF}$ is filtered by a low pass filter having a time constant of approximately 0.15 second. The filter prevents abrupt changes of the reference rotational speed $R_{REF}$ from bringing about abrupt changes of the extent of engagement (or disengagement) of the friction clutch 14 to thus ensure that the extent of engagement of the clutch 14 can be adjusted jointly with the engine RPM in response to new values.

For example, if the flap of the throttle valve 18 is rapidly moved to an open position well beyond the minimal open position, the engine 10 must be accelerated to a new RPM at which a higher torque is available. The adjustment of a new reference value $R_{REF}$ is delayed by the low pass filter so that the engine RPM can rise and that the clutch torque increases gradually when the new engine RPM is reached.

The characteristics of the low pass filter are determined in dependency upon the operating conditions, for example, as a function of the torque and the RPM of the engine, the extent to which the throttle valve 18 is open (i.e., the angular position of the flap of the throttle valve), and the selected starting ratio of the transmission 12.

At the time when the transmission 12 is shifted into a selected starting gear (such as into reverse or one of the first and second forward gears) and the vehicle is in the process of starting its (forward or rearward) movement, the RPM of the engine 10 can match or approximate the idling RPM; alternatively, the RPM can be higher than the idling RPM, e.g., due to actuation of the accelerator pedal 19 prior to shifting of the transmission 12 into the starting gear. Furthermore, the idling RPM could have been increased by the engine management system, for example, during the warmup stage. If the output RPM of the engine 10 has already risen above the lower threshold value due to opening of the throttle valve 18, the vehicle is set in motion when the transmission 12 is shifted into the selected starting gear (such as the (or one) reverse gear or the first or second forward gear).

Under the just outlined circumstances, the derivation of the reference rotational speed $R_{REF}$ is achieved by exponentially reducing the increased output RPM of the engine 10 to the idling RPM of the engine. This results in an increase of the initial value of $R_{REF}$ so that the difference between the engine RPM and $R_{REF}$ is reduced to an extent which is necessary to ensure that the clutch 14 is not engaged. If the intial $R_{REF}$ is reduced to the idling RPM of the engine, this results in an increasing difference between the engine RPM and the value of $R_{REF}$; this, in turn, brings about a progressive engagement of the friction clutch 14, i.e., an engagement beyond a mere contact between the friction linings of the clutch disc 43 on the one hand, and the adjacent friction surfaces of the pressure plate 40 and the counterpressure plate 42 on the other hand.

It has been ascertained that an exponential value reducing rate can ensure a satisfactory clutch engagement with a time constant of 0.8 second.

Figure 4:
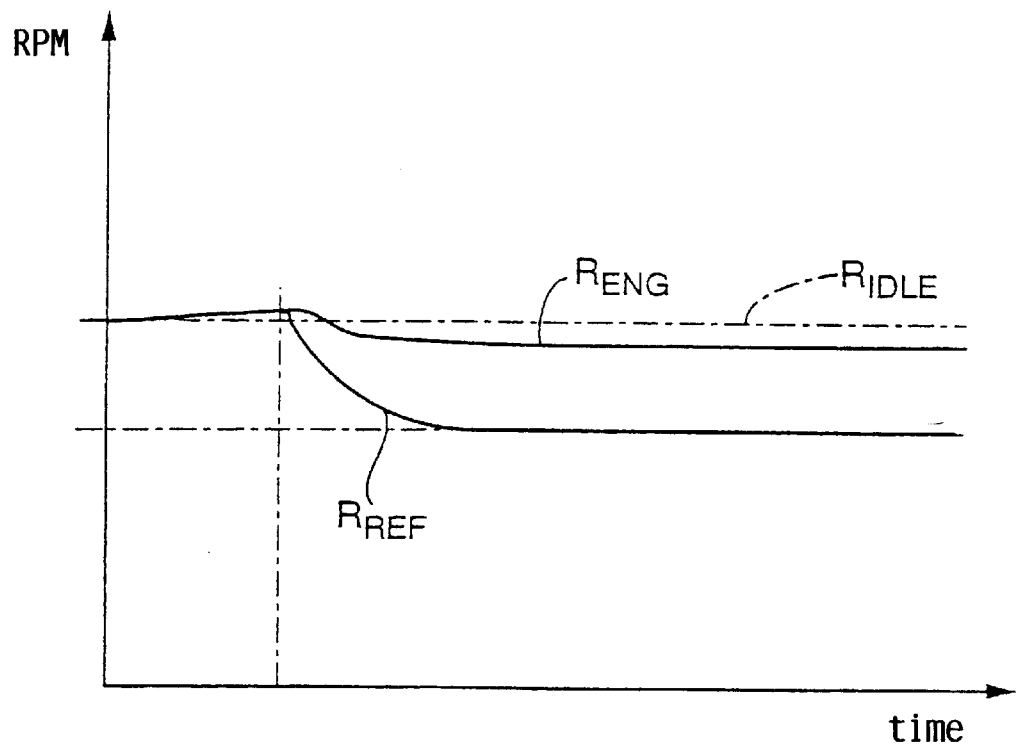
FIG. 4 shows a coordinate system wherein the curves denote changes of the RPM of the output element of the engine as a function of time during setting of the motor vehicle in motion in accordance with a feature of the present invention.

FIG. 4 illustrates the relationship between the reference value $R_{REF}$ and the engine speed $R_{ENG}$, such as normally develops during starting of the motor vehicle when the throttle valve 18 is opened just beyond the lower threshold value and is thereupon maintained in such open position. Starting of the motor vehicle is initiated while the output element 10b of the engine 10 rotates at the idling RPM, i.e., when $R_{INT}=R_{IDLE}$. As the opening of the throttle valve 18 progresses, the RPM of the output element 10b of the engine 10 rises gradually until the throttle valve flap assumes the angular position $\alpha_1$, i.e., an angular position slightly beyond or above the lower threshold value $\alpha_{LOW}$. When such lower threshold value is reached, a reference RPM is derived as follows:

$$R_{REF}=R_{INT}-K-K_1\alpha_{LOW}$$

wherein $R_{INT}=R_{IDLE}$ and $\alpha_{LOW}$ is normally 1%. Furthermore, $R_{REF}=R_{INT}-K-K_1=R_{IDLE}-100-60$ (for typical values K=100 1/min and $K_1$=60 1/min per %)=$R_{IDLE}$=160 1/min.

Due to low pass filtering of the initial value of the reference speed $R_{REF}$, the latter gradually decreases from $R_{IDLE}$–160 1/min which prevents abrupt engagement of the friction clutch. If the throttle valve 18 is opened beyond the low threshold value, the value of $R_{REF}$ continues to decrease so that, when the extent of opening of the throttle valve 18 reaches $\alpha_1$, it can be expressed by the equation $$R_{REF}=R_{IDLE}-K-K_{1\alpha}1.$$

The friction clutch 14 starts to become engaged while the value of $R_{REF}$ decreases and the difference between the engine speed and the value of $R_{REF}$ gradually increases. In the just described embodiment, the engine speed decreases to a value slightly below the idling RPM of the engine 10 as indicated by the curve $R_{ENG}$ in the coordinate system of FIG. 4. In this example, the clutch torque is likely to be insufficient to overcome the static friction of the motor vehicle so that the vehicle continues to remain at a standstill.

Figure 5:
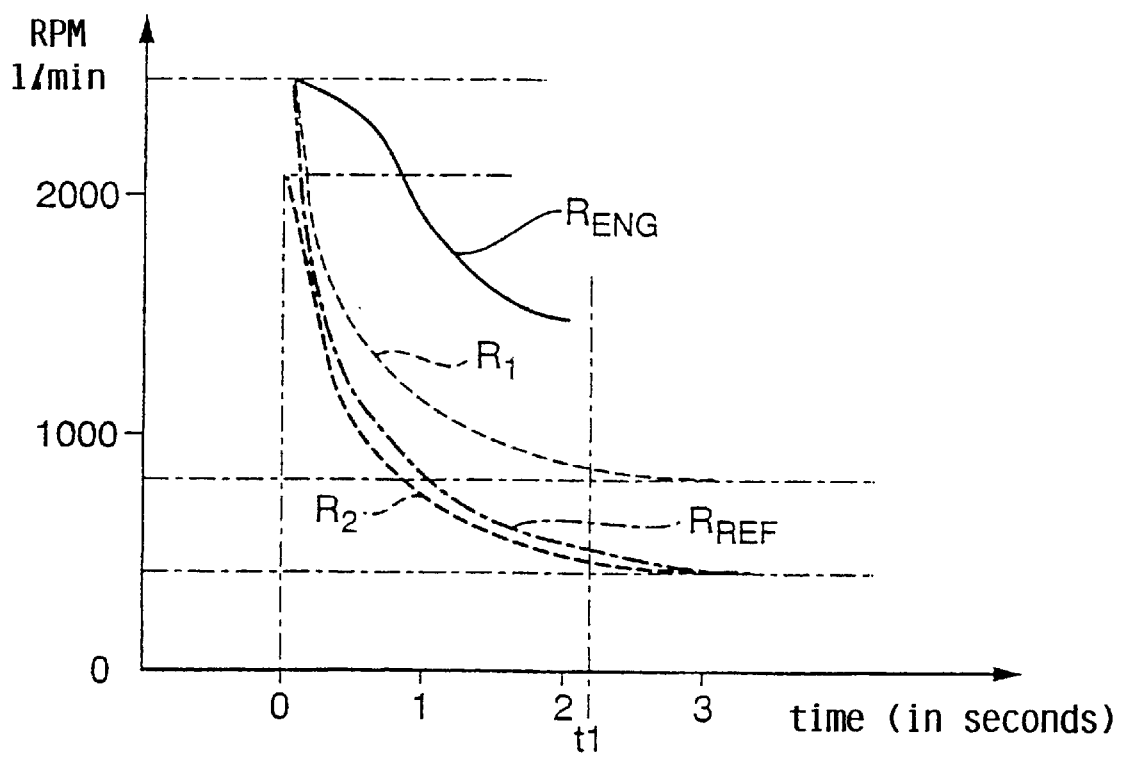
FIG. 5 illustrates a coordinate system wherein the curves denote changes of the RPM of the output element of the engine as a function of time in accordance with another feature of the invention.

In the embodiment which is represented by the curves in the coordinate system of FIG. 5, the engine RPM is raised to approximately 2500 1/min as a result of opening of the throttle valve 18, the angular position of the throttle valve remains constant at $\alpha_2$, and the transmission 12 is shifted into a gear or speed other than neutral. If such shifting takes place while the engine speed equals or approximates 2500 1/min, the thus derived reference speed $R_{REF}=R_{INT}-K-K_{1\alpha}2$. $R_{INT}$ initially amounts to or approximates 2500 1/min but is reduced exponentially to the idling speed $R_{ENG}$ of the engine 10 (see the curve R1 in FIG. 5).

Furthermore, and owing to low pass filtering, the final value of the reference speed decreases gradually from the engine speed to the derived value for the throttle valve opening angle $\alpha_2$ (see the curve R2 in the coordinate system of FIG. 5). This causes the reference RPM to gradually decrease from 2500 1/min to the derived value, namely to $R_{IDLE}-K-K_{1\alpha}2$ as shown by the curve $R_{REF}$. For example, $R_{IDLE}$ can be in the range of 2500 1/min or less.

The just discussed gradual decrease of the reference RPM entails an increase (widening) of the difference between the engine RPM and the reference RPM; this, in turn, brings about a gradual disengagement of the clutch 14 and such gradual disengagement of the clutch effects a reduction of the engine speed (i.e., of the engine RPM) as represented by the curve $R_{ENG}$ of FIG. 5. In this embodiment, the starting operation is completed when the RPM of the pressure plate 40 matches the engine RPM; such situation can develop, for example, at the instant $t_1$ indicated at the abscissa of the coordinate system shown in FIG. 5.

In accordance with our aforedescribed invention, the regulation of the starting of the motor vehicle on the basis of the difference between the engine speed and the reference RPM is continued until the RPM of the pressure plate 40 matches the engine speed and the clutch 14 operates without slip. However, it is of advantage, at least under certain circumstances, if the clutch actuating means is operated in such a way that the clutch transmits torque with some (relatively small) slip while the transmission 12 is being shifted into a selected gear other than neutral. Thus, if the clutch 14 operates with a certain slip while the transmission 12 is being shifted from neutral gear into reverse, first forward or second forward gear, the magnitude of torque being transmitted is determined by the extent of slip between the clutch disc 43 on the one hand, and at least one of the plates 40, 42 on the other hand. Such mode of operation ensures that the magnitude of transmitted torque is not subject to abrupt changes. Moreover, and if the clutch 14 is not fully engaged, it is necessary to mount the clutch actuating mechanism with a certain amount of play in order to disengage the clutch preparatory to the next gear shifting operation. This ensures that a shifting into a higher gear (such as from the first into the second gear, from the second into the third gear, etc.) can be carried out more rapidly than if the clutch were to operate without play.

During the next-following stage of the vehicle starting operation, namely when the RPM of the pressure plate 40 comes closer to the engine speed, the control unit 36 (or an equivalent thereof) can operate the clutch 14 in such a way that the engine speed asymptotically approaches an offset or displacement value of the RPM of the pressure plate. The extent of such offset is generally in the range of about 50 l/min. An advantage of such undertaking is that the torque transmission is softer or gentler because the acceleration of the speed (engine RPM) and the RPM of the pressure plate and their joint increase are of a progressive nature.

Once the starting operation is in progress, it can be interrupted by moving the mobile part or parts of the throttle valve beyond a closed position, namely a position normally; corresponding to the lower threshold value. Once this has taken place, the starting operation is interrupted by continuously raising the reference RPM until the disengagement of the friction clutch 14 is completed. Once the throttle valve 18 is opened beyond the lower threshold value, the condition of engagement of the clutch 14 is withdrawn or altered when the throttle valve 18 is closed because the engine speed is then closer (nearer) to the reference RPM.

It is further possible to provide means for interrupting the starting operation, subsequent to shifting of the transmission into one of the reverse or lower forward gears, in the absence of any undertakings to open the throttle valve beyond a lower threshold value. This can be achieved by resorting to a timing circuit. Still further, it is possible to interrupt the vehicle starting procedure in that, after elapse of a predetermined interval of time, the prerequisites for completion of the starting operation are not present.

The improved power plant is susceptible of numerous additional modifications without departing from the spirit of the present invention. For example, the hydraulic clutch engaging/disengaging means 20, 22 can be replaced with pneumatic clutch operating means or with an operating means employing at least one electric motor or the like.

Without further analysis, the foregoing will so fully reveal the gist of the present invention that others can, by applying ,current knowledge, readily adapt it for various applications without omitting features that, from the standpoint of prior art, fairly constitute essential characteristics of the generic and specific aspects of our contribution to the art of power trains for use in motor vehicles and, therefore, such adaptations should and are intended to be comprehended within the meaning and range of equivalence of the appended claims.

What is claimed is:

1. A power train for use in motor vehicles, comprising:
    a variable-speed prime mover arranged to furnish a plurality of torques including a maximum torque and having an output element arranged to rotate at a plurality of speeds;
    means for varying the speed of said prime mover, including an energy supplying device adjustable between a plurality of positions including a threshold position;
    a transmission selectively shiftable into a neutral gear and a plurality of additional gears;
    means for shifting said transmission into different gears;
    a torque transmitting friction clutch engageable and disengageable to respectively transmit and interrupt the transmission of torque between said output element and a rotary input element of said transmission; and
    control means for said clutch, including means for disengaging the clutch prior to shifting of said transmission from said neutral gear into one of said additional gears preparatory to setting of the vehicle in motion in response to shifting of the transmission into said one additional gear, to subsequent adjustment of said device beyond said threshold position and subsequent to partial engagement of said clutch to a condition in which the clutch transmits torque without play in the power train, said control means being arranged to effect a greater engagement of the clutch beyond said partial engagement in response to the establishment of a predetermined difference between an actual speed of said output element and a reference speed, said greater engagement of the clutch resulting in the transmission of a torque corresponding to that when the speed of said prime mover at least approximates said reference speed regardless of the adjustment of said energy supplying device at the time of setting the vehicle in motion.

2. The power train of claim 1, wherein said prime mover includes a combustion engine and said energy supplying device includes a throttle valve for said engine, and further comprising an accelerator operatively connected with and arranged to adjust said valve.

3. The power train of claim 1, wherein said clutch includes at least one mobile pressure plate driven by said output element and an output member connected with said input element, the establishment of said partial engagement including a movement of said at least one pressure plate into frictional engagement with said output member and said control means being further arranged to engage said at least one pressure plate with said output member and to thus establish said condition of the clutch when said energy supplying device is adjusted to assume said threshold position.

4. The power train of claim 3, wherein said control means is arranged to engage said clutch with a slip between said at least one plate and said output member to an extent such that the torque being transmitted by the clutch is less than but approximates said maximum torque.

5. The power train of claim 1, wherein said reference speed is a function of the extent of adjustment of said energy supplying device and is selected to ensure that the extent of engagement of said clutch at least approximates the extent necessary to ensure that the torque being transmitted by the clutch at least approximates the torque being transmitted by the output element of said prime mover.

6. The power train of claim 5, wherein said reference speed is derived by subtracting a function depending upon the position of said energy supplying device from an initial speed of said prime mover.

7. The power train of claim 5, wherein said reference speed is derived from an initial prime mover speed by subtracting from said initial prime mover speed a constant and a first function dependent upon the position of said energy supplying device and by adding—at positions of said energy supplying device beyond a threshold postion—a second function dependent upon the position of said energy supplying device.

8. The power train of claim 7 wherein, in at least one position of said energy supplying device beyond a second threshold position, said reference speed is maintained at a maximum value.

9. The power train of claim 8, wherein said maximum value is at most 1000 RPM above an idling speed of said prime mover.

10. The power train of claim 8, wherein said maximum value is at most 500 RPM above an idling speed of said prime mover.

11. The power train of claim 1, wherein said reference speed is a function of the position of said energy supplying device, of the selected gear of said transmission and the speed of the motor vehicle, said reference speed being derived in accordance with the equation $$R_{REF} = f(\alpha, \text{gear, vehicle speed})$$

wherein $R_{REF}$ is reference speed, a is the angular position of a pivotable member of said device expressed as a percentage of full travel of said device, and "gear" is the gear selected by said shifting means.

12. The power train of claim 11, wherein said reference speed is further derived in dependency upon buffer means, the rate of change of said reference speed with changes of the angular position of said pivotable member being matched with the changes of speed of the prime mover in response to changes of position of said pivotable member.

13. The power train of claim 12, further comprising means for low pass filtering the reference speed to establish a dynamic correspondence between the reference speed and the speed of said prime mover.

14. The power train of claim 13, wherein the characteristics of said means for low pass filtering vary with shifting of the transmission into selected gears and as a function of variations of at least one of (a) the speed of said prime mover, (b) the speed of said input element of said transmission, and (c) the speed of the motor vehicle.

15. The power train of claim 13, wherein the output of said means for low pass filtering has an initial value at least substantially matching the speed of said prime mover.

16. The power train of claim 13, wherein the output of said means for low pass filtering converges upon the value of the reference speed determined by the position of said energy supplying device.

17. The power train of claim 1 wherein, in deriving said reference speed from an initial speed of said prime mover, the initial speed is reduced exponentially toward an idling speed of the prime mover.

18. The power train of claim 1, wherein said reference speed is derived in accordance with the equation $$R_{REF} = R_{INT} - K - K_1 + K_2(\alpha - \alpha_T)^2$$

wherein $R_{INT}$ is an initial speed of said prime mover, K is a first constant, $K_1$ is a second constant, $K_2$ is a third constant, a is the angular position of a pivotable member of said energy supplying device expressed as a percentage of full travel of said pivotable member, $\alpha_T$ is a threshold angle of said pivotable member expressed as a percentage of full travel of said pivotable member, and $K_2(\alpha - \alpha_T)^2$ is applicable only when $\alpha > \alpha_T$.

19. The power train of claim 18, wherein $\alpha_T$ is between 40% and 60% of full travel of said pivotable member of said energy supplying device.

20. The power train of claim 18, wherein the values of said constants are dependent upon the selection of the gear of said transmission.

21. A clutch control system for the automatic control of an engageable and disengageable clutch in a motor vehicle, said clutch connecting an engine with a gearbox and said gearbox having a plurality of fixed ratios and a neutral ratio as well as selector means by which said neutral and any one of said fixed ratios may be selected, the motor vehicle being provided with a throttle and a throttle control for controlling the speed of the engine, the clutch control system automatically controlling the engagement and disengagement of the clutch to permit changing of the gear ratio, the clutch control system being arranged to permit take-up from disengagement of the clutch to be initiated upon selection of the take-up gear, subsequent opening of the throttle control beyond a threshold value causing the clutch to be engaged to a point at which any lost motion in a power train between the engine and the gearbox is subsequently taken up, further engagement of the clutch depending upon the difference between the actual speed and a reference speed of the engine and the reference speed being derived in such a way that the difference between the actual speed and the reference speed establishes an extent of clutch engagement which transmits torque substantially equal to torque being furnished by the engine at the actual engine speed over the full range of throttle openings encountered during takeup from rest operation.

* * * * *